United States Patent
Angel

(10) Patent No.: US 6,907,408 B2
(45) Date of Patent: Jun. 14, 2005

(54) HIERARCHICAL AUTHENTICATION PROCESS AND SYSTEM FOR FINANCIAL TRANSACTIONS

(76) Inventor: Albert J. Angel, 1895 NE. 214 Ter., N. Miami Beach, FL (US) 33179

( * ) Notice: Subject to any disclaimer, the term of this patent is extended or adjusted under 35 U.S.C. 154(b) by 132 days.

(21) Appl. No.: 10/161,952

(22) Filed: Jun. 4, 2002

(65) Prior Publication Data

US 2003/0225703 A1 Dec. 4, 2003

(51) Int. Cl.$^7$ .............................................. G06F 17/60
(52) U.S. Cl. ......................................... 705/64; 380/258
(58) Field of Search .............................. 705/64, 40, 41; 380/258, 270; 382/124; 713/186; 700/200, 231; 235/380

(56) References Cited

U.S. PATENT DOCUMENTS

| | | | |
|---|---|---|---|
| 5,465,387 A | 11/1995 | Mukherjee | 455/26.1 |
| 5,544,322 A | 8/1996 | Cheng et al. | 395/200.12 |
| 5,721,781 A | 2/1998 | Deo et al. | 380/25 |
| 5,757,916 A | * 5/1998 | MacDoran et al. | 380/258 |
| 5,996,077 A | 11/1999 | Williams | 713/201 |
| 6,029,124 A | * 2/2000 | Gillick et al. | 704/200 |
| 6,431,439 B1 | * 8/2002 | Suer et al. | 235/380 |

FOREIGN PATENT DOCUMENTS

JP 411219397 A * 8/1999

OTHER PUBLICATIONS

Palm Pilot for credit/debit/cash card with biometric;; Reasearch disclosure, May 1999, Uk;vol. 42.*

* cited by examiner

Primary Examiner—Pierre E. Elisca
(74) Attorney, Agent, or Firm—Robert C. Kain, Jr.; Fleit, Kain

(57) ABSTRACT

The method of confirming an identity of a person who requests a financial transaction utilizes a plurality of confirmatory processes. Some of these processes include a voice responsive interactive session, an interactive electronic data session, acquiring and comparing a third set of acquired data with data from the person, and acquiring and comparing nth sets of acquiring data with data from the person. Each confirmatory process has time and cost factors associated therewith. The processes are prioritized and correlated to external factors such as the frequency of inquiry, communications channel data, the communications device, random selection criteria and sampling rate criteria. The financial transaction request is processed and cleared or rejected. Some acquired data is stored data and has a nominal cost and a substantially instantaneous. Other types of data are acquired from commercial data sources. Representative time and cost factors are utilized in order to establish a hierarchy of confirmatory processes based upon the external factors.

32 Claims, 3 Drawing Sheets

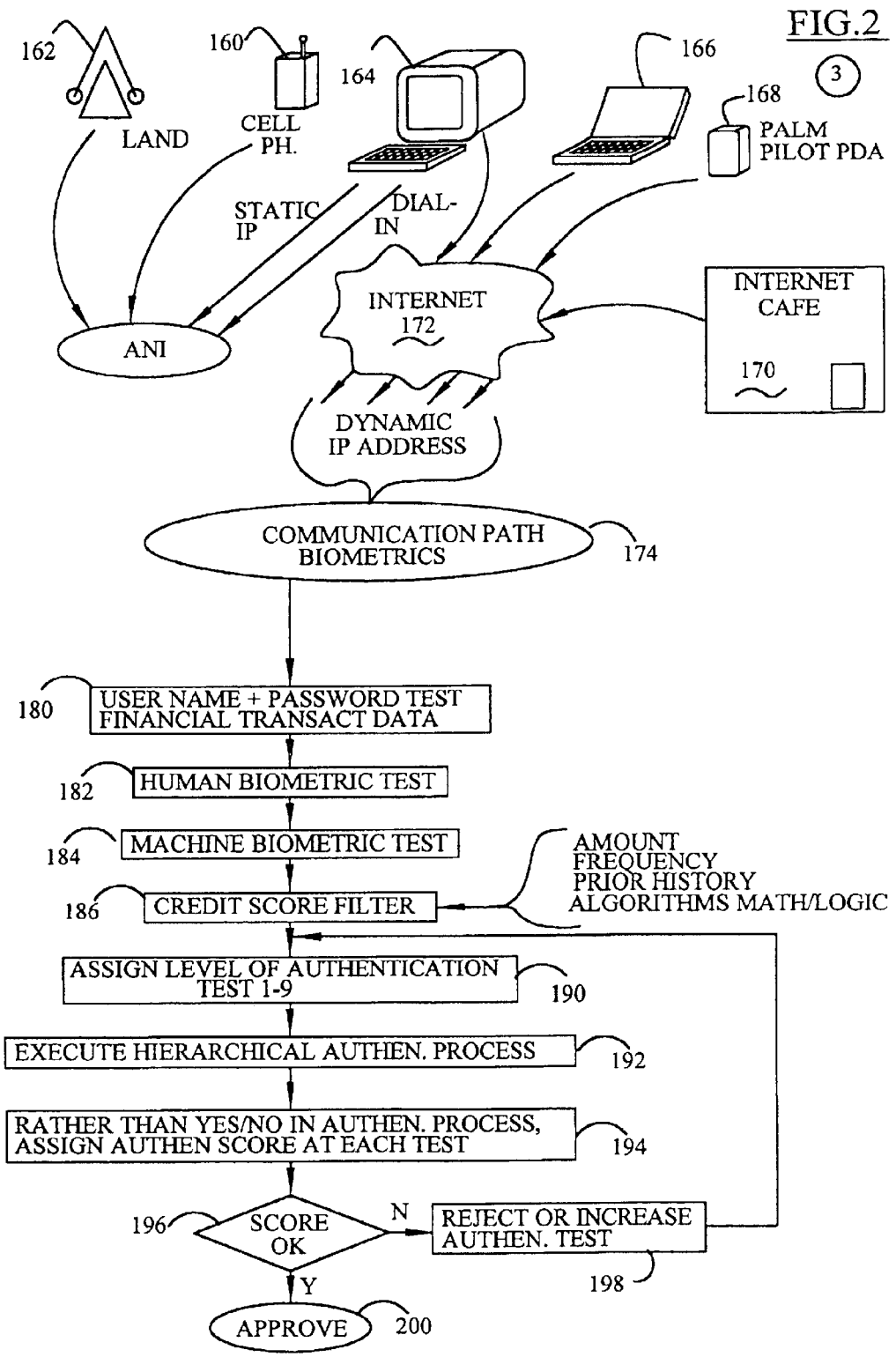

HIERARCHICAL AUTHENTICATION PROCESS AND SYSTEM FOR FINANCIAL TRANSACTIONS

The present invention relates to a hierarchical authentication process and computer system for financial transactions which confirms the identity of a person seeking to execute a financial transaction utilizing time-based and cost-based hierarchical confirmatory processes.

BACKGROUND OF THE INVENTION

In an effort to expand the methods by which consumers (both individuals and businesses) purchase goods and services, merchants or vendors have added new communications channels which enable consumers to buy goods and services without personal contact with the merchant or vendor. As used herein, the term "consumer" is not limited to a person but includes any individual or entity seeking to purchase something from another. The term "merchant" or "vendor" includes individuals and entities who sell or deliver any type of good or service including informational services, data, images and entertainment services, such as radio, television, video, gaming results and gaming events, event results, etc. With the proliferation of new ways for consumers to purchase goods and services from merchants, it is increasingly difficult to authenticate the person seeking to execute a financial transaction in order to complete the purchase.

As an example, if a person seeks to purchase goods or services over the global computerized network, commonly called the Internet, that person may access the Internet via a personal computer, a cellular telephone (properly configured), a personal digital assistant (PDA), or other Internet enabled device. Surfing or browsing on the Internet is essentially an anonymous activity. However, the communications device selected by the person/consumer sometimes carries with it communications channel data. Once the consumer has selected the goods or services, the person may have several different types of financial instruments which permits him or her to purchase the goods or services. These financial instruments include credit cards, debit cards, checking accounts with electronic access (electronic checks), charge back systems linked to land line telephones, charge back systems linked to cellular telephones and potentially other electronic payment systems linked back to financial assets of the consumer.

A problem arises in clearing or authenticating the identity of the person with the requested financial transaction. It is well known that the proliferation of communications channels and the proliferation of new mechanisms to pay for goods and services results in greater identity theft, identity fraud, credit card fraud and other financial transaction fraud. If a vendor or merchant could identify the person and link that person to the financial instrument presented for the financial transaction, the merchant would be assured that the person's identity was authenticated and that the financial transaction is a valid and acceptable transaction.

Rather than implementing an authentication system, merchants and vendors typically contract or arrange with third parties to process financial transactions over the Internet and other electronic networks. Therefore, a particular financial transaction for a particular good or service may entail the consumer, the merchant, a third-party payment processor, and a financial institution or organization which provides the consumer's funds to the merchant based upon the completed financial transaction. Further, authentication processes are utilized by financial institutions issuing the credit cards and other financial instruments.

OBJECTS OF THE INVENTION

It is an object of the present invention to provide a hierarchical authentication process for financial transactions.

It is another object of the present invention to take into account time factors and cost factors in order to authenticate the identity of a person requesting a financial transaction.

It is another object of the present invention to provide a methodology accounting for data acquisition time, data acquisition cost, and characteristics of the requested financial transaction in order to determine the type and scope of confirmatory processes employed prior to clearance of a financial transaction as a result of confirming the identity of the person requesting the financial transaction.

It is another object of the present invention to utilize acquired data stored in a system and representing the person potentially seeking to execute the financial transaction and, in other instances, acquired data from commercial data sources.

It is a further object of the present invention to account for the time to interact with the person seeking to execute the financial transaction, the time to acquire the data and the cost associated therewith as well as a variety of external factors which bear upon the personal confirmation process.

SUMMARY OF THE INVENTION

The method of confirming an identity of a person who requests to execute a financial transaction utilizes a plurality of confirmatory processes. Some of these processes include a voice responsive interactive session with the person (comparing responsive data with first acquired data), an interactive electronic data session comparing responsive data with second acquired data, acquiring and comparing a third set of acquired data with data from the person, and acquiring and comparing nth sets of acquiring data with data from the person. Each confirmatory process has time and cost factors associated therewith. The confirmatory processes are prioritized based upon the time factors and the cost factors and are correlated to external factors such as the frequency of inquiry, charge back data, bill payment data, amount of the requested financial transaction, communications channel data associated with the financial request, the communications device selected by the person seeking to execute the financial transaction, random selection criteria and sampling rate criteria. The financial transaction request is processed with the confirmatory processes and cleared or rejected based upon the confirmatory processes. Some acquired data is stored data and hence may be considered to have a nominal cost factor and a substantially instantaneous time factor. Other types of acquired data are acquired from commercial data sources. Hence, data acquisition time and data acquisition cost become factors in confirming the identity of a person who requests the financial transaction. True data acquisition times and data acquisition costs are typically not utilized but representative or assigned times and costs are utilized in order to establish a hierarchy of confirmatory processes prior to the time of inquiry based upon the external factors for the financial transaction. More comprehensive confirmatory processes are provided dependent upon increasingly higher frequencies of inquiry, increasingly higher amounts for the financial transaction, requests for transactions which increasingly deviate from prior requested financial transactions for the person currently seeking the transaction, among other things.

BRIEF DESCRIPTION OF THE DRAWINGS

Further objects and advantages of the present invention can be found in the detailed description of the preferred embodiment when taken in conjunction with the accompanying drawings in which:

FIG. 2 diagrammatically illustrates a combination system diagram and an authentication process in accordance with the principles of the present invention.

DETAILED DESCRIPTION OF THE PREFERRED EMBODIMENT

Figure 1A:
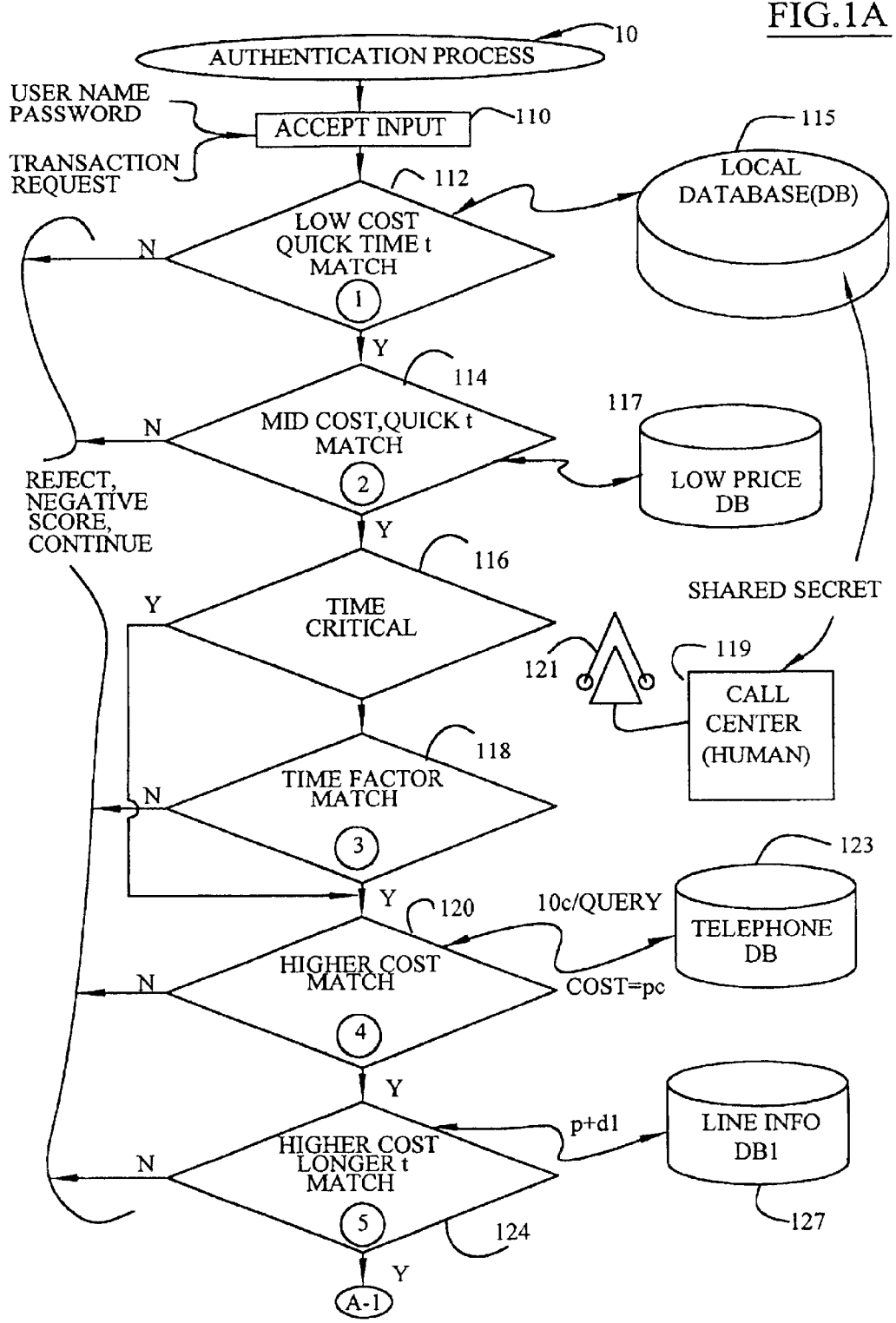
FIGS. 1A and 1B diagrammatically illustrate the authentication process typically implemented as a computerized process.
Figure 1B:
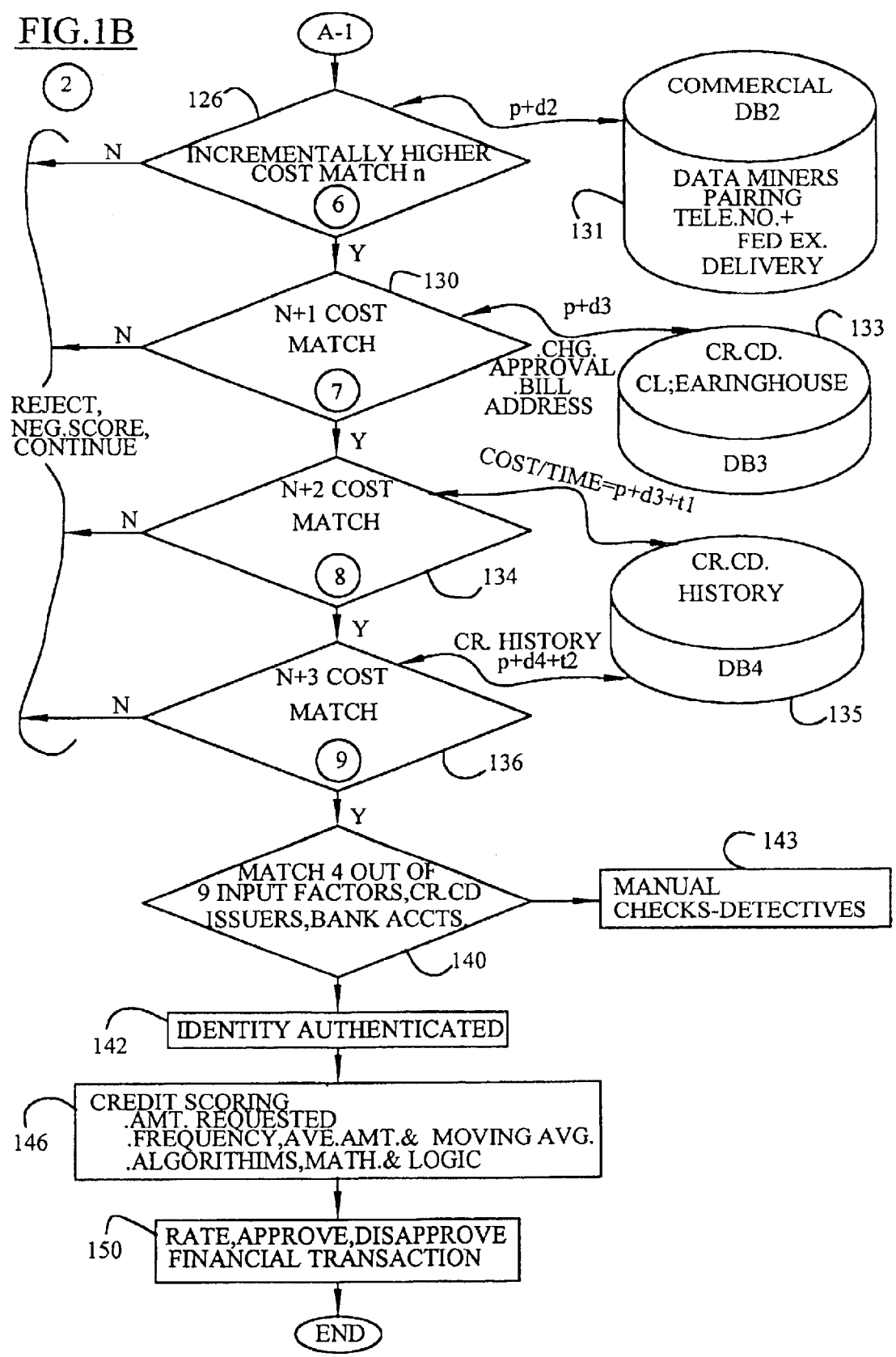

The present invention relates to a hierarchical authentication and process for financial transactions. FIG. 1A and FIG. 1B diagrammatically illustrate the authentication process which is typically implemented on a computer system or a plurality of computer systems linked together. Unless otherwise specified, the order of the processing steps may be changed. The following abbreviations table provides some abbreviations for term utilized herein.

| Abbreviations Table | |
|---|---|
| Amt | Amount |
| ANI | Automatic Number Identification (such as caller id or cell phone identifier) |
| Athen | Authentication |
| cr. cd. | credit card |
| DB | database |
| IP | Interest Protocol Address |
| math | mathematic |
| n | a number (n < n + 1 < n + 2) |
| neg. | negative |
| p | a price or cost (p < p + d1 < p + d2) |
| PDA | personal digital assistant |
| t | time (t1 is shorter than t2) |

The authentication process in FIG. 1A begins by accepting an input from a person or a consumer in step 110. Although the term "person" is used herein, the term is not limited to an individual but is equally applicable to any entity seeking to engage in a financial transaction. In step 110, the person enters his or her user name, and may enter a password, and also enters a financial transaction request. The person may directly enter this information or this information may be passed to a financial transaction processor referred to above as the third-party processor. The financial transaction processor operates the authentication program. Whether directly submitted to the authentication process or transmitted through a vendor or other party, the user or consumer name and financial transaction request is obtained in step 110. Other information may also be obtained as discussed later. This other information may include information about the communications device employed by the person seeking to process the financial transaction. Alternatively or in addition thereto, the communications device may have communications channel data associated therewith. For example, a cellular telephone typically has an ANI or automatic number identification. Another communications device, a land line telephone, typically has communications channel data represented by a telephone caller id. Other types of communications devices and communications channel data are discussed later in conjunction with FIG. 2.

Returning to FIG. 1A, the system accepts input from the person seeking to clear or engage in a financial transaction. Step 112, in the illustrative embodiment, employs a low cost, quick time $t_1$ match by comparing the username and the supplied password with information from a local database DB 115. Accept input step 110 may utilize a voice responsive system which converts voice analog information from the person into digital information (a representation of the voice data) and then compares the responsive data from the person with the acquired data from local database 115. Voice print matching is also contemplated. One example of the acquired data would be a password previously stored for that person in local database 115. Another example is the person's address and telephones numbers (land line and cell phone). Since local database 115 represents previously stored information in the same computer system or a closely linked computer system to the system executing authentication process 10, the time to acquire the data is very short (substantially instantaneous) and the cost to acquire that data and compare it against the input username and input password is also quite low, virtually nominal. Other distributed computer systems may have a time factor due to communications bandwidth time factor or other equipment delay issues. If a match occurs, the system clears authentication level 1 at step 112 and the YES branch is taken to step 114. If the person seeking to conduct the financial transaction does not clear level 1 and step 112, the NO branch is taken. The NO branch leads to either a rejection of the transaction (terminating the communications channel and session request) or, as explained later, results in a negative score assigned to the financial transaction request. If a negative score is assigned, the system continues to the next level. As stated earlier, the system operator can rearrange the sequence of financial clearance and personal authentication levels 1–9 as appropriate. At authentication level 2, step 114, the system executes a mid-level cost but a quick time search to determine whether responsive data input either via voice or electronically by the user results in a match or rejection. In step 114, the system contacts and acquires a low cost database 117. Additional interaction with the person seeking to process the financial transaction may be included in step 114. In other words, the person seeking the financial transaction may be required to complete a user profile prior to input step 110 or, alternatively, the system executing authentication process 10 can interact at repeated levels 1–9 with the person seeking the financial transaction in order to determine whether the person is genuine and has authority to initiate the financial transaction. The input step 110 may be used at many authentication level 1–9. The following Local Database Table identifies typical fields or data stored in the local database.

| Local Database Table |
|---|
| user name |
| address |
| personal data |
| business data |
| password |
| shared secret word, phrase code |
| user's historic transaction data |

If the inquiring person's responsive data does not match the acquire data from low cost database 117, in step 114, the NO branch is taken and the person's request is either rejected or a negative value is assigned to the transaction. If the YES branch is taken, the system executes step 116 which determines whether the requested financial transaction is time critical.

It should be appreciated that the authentication process described herein may be implemented for very simple transactions, for example, those transactions representing less than $20.00 implemented over the Internet when the inquiring party seeks to close a financial transaction with the use of a credit card. Alternatively, the authentication process presented herein could be utilized for more complex transaction such as purchases involving large amounts of money and electronic debits accessed against the person's bank account. Further, different transactions have different "expectation times" associated therewith. The expectation time for a person seeking to making a $20.00 credit card transaction over the Internet is much shorter than a person seeking to place a $2,000.00 bid for goods or services in an electronic auction. In other words, the higher the value of the financial transaction, the greater the amount of time the person seeking to clear the transaction will accept an authentication process to authenticate the person's identify and the veracity of the financial instrument sought to be utilized in the transaction. Additionally, people are willing to wait (a long expectation time) to clear financial transactions when they understand that their current financial transaction is significantly different in frequency or in time or in location compared with other financial transactions for that financial instrument. For example, a person typically living in the U.S. and utilizing a particular credit card would not be surprised if, during a trip overseas, that person was requested to identify personal identifying information previously stored by the credit card company prior to closing a financial transaction at an overseas location. Contrariwise with respect to an electronic auction, the time expectation may be short due to the short time to place a bid on line. Hence, the expectation time is a factor in prioritizing the authentication process. Expectation time is based upon the type of financial transaction.

Some financial transactions must be closed quickly in order to facilitate the purchase. Step 116 recognizes that some transactions are time critical whereas other transactions are not so time critical. If the transaction is time critical, the YES branch is taken and the system jumps to step 120. If not, the system takes the NO branch from step 116 and executes step 118. The time critical decision step may be after input 110. Step 118 recognizes that the time of the financial transaction may deviate from typical times associated with that person in the local database 1115. For example with respect to gaming entertainment, the database may have data historically indicating that a person engaged in many transactions between the hours of 6:00 PM and 11:00 PM, Monday through Friday. Local database 115 stores a historic analysis regarding financial transactions for the person including amount, frequency, time of day and day of week instances, amount other data. If the time factor for the gaming entertainment is significantly different or deviant from other time factors for similar transactions, as indicated in store data record 115, step 118 may engage a call center 119 to interact in a question and answer session with the person seeking to clear the financial transaction. The call center is typically a telephone call center wherein an operator would utilize telephone 121 and discuss certain information with the person such as a shared secret stored in local database 115. The shared secret is somewhat different than the password in that the shared secret is not typically input by the person at the initiation of the authentication process. Typical shared secrets are the maiden name of the mother of the person holding the credit card.

If the person does not provide the proper confirming information or responsive data to the operator at call center 119, the NO branch is taken from step 118 and a rejection or negative score is assigned to the financial transaction.

It will be appreciated that the utilization of call center 119 has a high time factor and a high cost factor associated therewith relative to the electronic utilization of local database 115.

If the person passes level 3, the YES outcome of step 118, step 120 determines whether the requested financial transaction matches a higher cost and potentially different data acquisition time period than discussed earlier. At authentication level 4, step 120 accesses telephone database 123. Telephone database 123 results in a charge to the system operator of authentication process 10 of some amount, that is, a cost to obtain the data. In the illustrated embodiment, a 10 cent charge per inquiry is assessed for that a acquired data. Further, step 120 recognizes that the authentication process acquires the data from a non-system source or a commercial data source. The commercial data source in this instance is the local, regional or national telephone company. If the responsive data from the person matches the acquired data from this commercial data source, the YES branch is taken from step 120, level 4, and the system executes step 124 or level 5. The NO branch from step 120 results in a rejection or a negative score.

In step 124, a higher cost database is accessed and further the access time to acquire that data is longer than the access time at level 4. Step 124 acquires data from database 127 indicated as line information database DB1. The Line Information Database Table set forth below identifies some data which can be purchased from the telephone company.

---
Line Information Database Table
---
Telephone line pairing, listed name with unlisted number
Name and group of phone numbers (related numbers)
record 50
Number of charge backs (bill disputes record)
Amount of charge backs
Frequency of charge backs
---

For example, the authentication process may request whether the land line telephone which is currently used by the person seeking to clear the financial transaction is paired with another listed name or with an unlisted number. The pairing with listed name is checked against local database 115 to determine whether the person on that line is an "authentic" person in local database 115. In this sense, the caller id is the communications channel data which is supplied to authentication system 10 based upon the communications device utilized by the person entering the authentication process. Although not directly supplied by the person, the communications channel data is associated with the person upon making the inquiry into the authentication process 10. The Line Information Database Table available from the telephone company may include the name and group of phone numbers or related phone numbers, record 50 which is an indication of the number of charge backs or bill dispute records for a person including the number of times such charge backs were made, the amount of charge backs or both. The NO branch from step 124 leads to a rejection or a negative score whereas the YES branch passes the person from authentication level 5 to the next step 126 in FIG., 1B via jump point A-1. Step 126 implements an incrementally higher cost database. This incrementally higher cost database is represented by commercial database DB2 and is priced p+d2. Access to DB1 costs p and access to DB2 costs p+d2. Commercial database DB2 or database 131 represents other commercial data sources such as companies that mine publicly available data and pair that publicly available data with other captured data such as linking telephone numbers, white page directory information, yellow page directory information with Federal Express shipping data, etc. As with the earlier levels, the NO branch from step 126 leads to a rejection or a negative score and the YES branch leads to authentication level 7 and step 130.

Step 130 is the next level higher data acquisition and cost matching step n+1. Step 130 accesses credit card clearing housing database 133 or DB3. Credit card clearinghouse database is costly as represented by cost charge p+d3 which is larger than the charge to access and acquire the data from commercial database DB2. However, the credit card clearinghouse database DB3 provides charge approval records and billing address records to the authentication process. For example, the authentication system operator may request whether DB3 has a John Doe with social security number XXY-Z42 and DB3 may answer YES or NO. This is a low cost but high time factor inquiry. The YES branch from step 130 leads to step 134 which is the n+2 higher cost match authentication level 8. Step 134 accesses a credit card history DB 4 or database 135. The cost and the time to access credit card history database 135 is higher than the previous levels 6 and 7 because the price is p+d3 and the access time to obtain that data is t1. T1 is greater than the access time to initially access credit clearinghouse data from DB3. The NO branch from step 134 leads to a rejection or a negative score whereas the YES branch leads to authentication level 9. Step 136 or authentication level 9 is the next higher cost level n+3 which returns to credit card history database 135 and obtains the full credit history. There is a higher cost for this credit card history for the inquiry party p+d4 and it takes a longer time to acquire this data as indicated by t2. The YES decision output from step 136 results in execution of step 140.

Step 140 determines whether there is a match or a confirmation of a number of the earlier authentication levels. For example in the illustrated embodiment, if the person seeking to engage in the financial transaction matches any 4 out of the 9 authentication levels, his or her financial transaction may be approved. The YES branch from decision step 140 leads to a recognition that the identity is authenticated in step 142. The NO branch from decision 140 leads to a manual authentication step 143. This manual identification step may include the use of the call center 119 or a detective or other non-computerized methodology. Of course, the simplistic presentation of authentication levels 1–9 discussed above is further complicated by associating greater weights to the quality of information obtained from the acquired data and the number of positive hits or confirming instances from the person seeking to clear the financial transaction with the acquired data or the previously stored data.

The Credit Card History Inquiry Table below provides some indication of a low cost inquiry to a credit history database 135 from step 134.

| Credit Card History Inquiry Table |
|---|
| 1st Level |
| Do you have a M. Smith at Elm Street? Answer Yes/No |

| -continued |
|---|
| Credit Card History Inquiry Table |
| 2nd Level |
| Credit history M. Smith with S.S. No. a3K7 |

Step 146 utilizes common credit scoring techniques to determine whether the currently proposed financial transaction is within the typical norms. For example, credit scoring processes monitor the amount requested, the frequency or utilization of the financial instrument, the average amount for that financial instrument in the past, moving averages, various algorithms and mathematic and logic devices to determine the authenticity of the financial instrument presented (the credit card or debit card or electronic check) against known parameters or data stored in the system (low cost and low time factor data) as well as data acquired through outside databases (telephone database 123, line information database 127, commercial database 131, credit clearinghouse database 133, and credit history database 135). Step 150 rates financial transaction, approves or disapproves the transaction and generates a result to the merchant and also typically to the consumer or prospective purchaser.

As stated earlier, authentication steps 1–9 may be reorganized in any sequence dependent upon external factors of the financial transaction and/or the expectation time of the person seeking to clear the financial transaction, the cost of data acquisition and the charge assessed by the system operator of the authentication process to the consumer. A person seeking to clear a large financial transaction may be willing to pay higher processing charges to the system operator for the authentication process and hence the utilization of commercial databases 131, 133 and 135 may be more acceptable to the system operator if access to this data and acquisition of this data is within the expectancy time and the processing fee assessed to the person seeking to close the financial transaction.

FIG. 2 diagrammatically illustrates both the system and high level processes for the authentication process. The person seeking to engage in the financial transaction may access the authentication process from various communication devices. The devices include, among others, cellular telephone 160, land line telephone 162, computer 164, laptop 166, palm pilot or personal data assistant 168, or an Internet cafe 170. Cell phone 160 may have an assigned number identifier ANI. Land line telephone 162 may also have an ANI, sometimes called a caller id. Computer 164 may have a static Internet protocol or IP address if the computer dials in directly into a telephone system. Alternatively, computer 164 may go through the Internet 172 in which case the computer 164 would be identified with a dynamic IP address. Laptop 166 may also access the authentication process 10 via Internet 172. Palm pilot or PDA 168 accesses the program via Internet 172. The person in an Internet cafe 170 would access the computer via Internet 172 and this would be assigned dynamic IP address. The authentication process, when utilized in conjunction with a dynamic IP address, would request certain biometric or personal characteristics of the person seeking to engage in the financial transaction. This is recognized as element 174. In this manner, the person's communications device may have identifying information, called "machine biometric" and this has an impact on the selection of the authentication processes utilized (authentication levels 1–9). Further, the communications device sometimes has associated therewith a communications channel data which assists or hinders the authentication of the person. ANI assists the authentication process but the dynamic IP address hinders the process. Further, computers 164, 166 and PDA 168 may contain cookies establishing that the person at the computer has visited vendors or other computer programs subject to authentication process in the past and the authentication process can gather that communications channel data from those computers or the PDA. Cookies are communication channel data.

Step 180 recognizes that the user inputs either via voice or electronically his or her name, password and request for financial transaction clearance. Step 182 recognizes that the authentication process may include some human biometric testing. Stress analysis on the voice is possible. In an advanced system, a biometric test would monitor the voice of the person and analyze that voice against a stored voice print. The stored voice print could be a local database 115 or low price database 117. Other personal biometric tests are possible such as utilizing the image of the person captured on computer 164 against an image stored in a local database or other database. Other biometric information may be obtained from the person seeking to conduct the financial transaction such as a fingerprint. The fingerprint would be electronically converted and submitted and compared against acquired or stored data. Step 184 recognizes that the machine utilized by the person has some unique characteristics. Hence, the machine is subject to a "machine biometric" test. The biometric for the cell phone 160 is the ANI. The biometric test for the land line telephone 162 is the caller id. Further, the caller ids can be matched against related call numbers and telephones as explained above in connection with telephone database 123. Similarly, static IP addresses for the computers can be matched against previously stored data in local database 115 or data obtained from telephone company in telephone database 123 or line info database DB1.

Step 186 recognizes that the authentication process utilizes a credit scoring system. This credit scoring system can be configured as a filter which accepts or rejects the financial transaction. Alternately, the filter can implement additional authentication processes while eliminating other authentication processes. These authentication processes are generally identified above as authentication levels 1–9. Credit score filter 186 considers the amount of the transaction, the frequency of the transaction within a certain time frame, the prior history of the person seeking the financial transactions and utilizes various algorithms both mathematic and logical.

Step 190 assigns a level of authentication and implements one or more authentication tests 1–9 in a predetermined and prioritized manner based upon external data such as the communications device, type of transaction, amount, frequency, channel data, etc. The priority of authentication levels 1–9 can be reorganized based upon the communication device utilized by the person, based upon the machine biometric test and based upon the human biometric test. These plus other external factors such as frequency of inquiry, previously acquired data, amount of financial transaction currently requested, random test selection criteria, sampling rate criteria, charge back data, bill payment data, etc., may determine (a) the number of authentication levels; and (b) which authentication levels are executed before other authentication levels. Essentially, the system operator for authentication process 10 establishes a matrices which takes into account external factors and machine biometric testing and human biometric testing as well as cost factors and time factors for the financial transaction and consumer expectation times for the timing of the transaction and this authentication process is executed pursuant to that matrix. Typically upon the initial inquiry, the selection of processes 1–9 and sequence of execution are fixed upon the initial inquiry based upon external factors. Further and in addition thereto, a rejection at one of the authentication levels may change the initial authentication sequence and may trigger the utilization of other authentication processes. Step 192 executes the hierarchical authentication process. Step 194 recognizes that rather than reject the inquiry, it may be more commercially acceptable to score the inquiry at each authentication level. Step 196 determines whether the score is accepted or not, the NO branch will leads to a rejection or an increase in the authentication testing in step 198 and returns to a point preceding step 190, assigning the level of authentication. A YES branch leads to an approval step 200 which approves and clears the financial transaction.

If the authentication process 10 is implemented by a third-party processor, that third-party process may not handle the money but may simply pass on an approval or a rejection indicator to the merchant or other vendor or person.

The claims appended hereto are meant to cover modifications and changes within the scope and spirit of the present invention.

What is claimed is:

1. A method of confirming identity of a person who requests to execute a financial transaction using time-based and cost-based hierarchal confirmatory and clearance processes comprising:

(a) establishing two or more confirmatory processes from the group of confirming processes including:

a voice responsive interactive session with said person, having an assigned representative first time and cost factors, and comparing responsive data with a first set of acquired data potentially representative of said person;

an interactive electronic data session, having an assigned representative second time and cost factors, comparing electronic responsive data from said person with said first set or a second set of acquired data potentially representative of said person;

acquiring and comparing a third set of acquired data, having an assigned representative third time and cost factors, with data from said person;

acquiring and comparing further sets of acquired data, each having an assigned corresponding representative further time and cost factors, with data from said person, said nth set of acquired data having one of a higher cost factor or a longer data acquisition factor or both a higher cost factor and a longer data acquisition factor;

(b) prioritizing said confirmatory processes based upon said time factors and cost factors correlated to a plurality of external factors from the group including a frequency of inquiry for said person, previously acquired data for said person, charge back data for said person, bill payment data for said person, amount of said financial transaction, a communications channel data associated with said person seeking said financial transaction, a communications device utilized by said person seeking to execute said financial transaction, a random selection, and a sampling rate for financial transactions;

(c) processing said request for said financial transaction from said person with said confirmatory processes based upon said external factors; and (d) clearing or rejecting said financial transaction based upon the use of the prioritized and established confirmatory processes.

2. A method of confirming identity as claimed in claim 1 including gathering said first, second, third and further sets of acquired data from commercial data sources.

3. A method of confirming identity as claimed in claim 2 wherein said commercial data sources have an assigned data acquisition time and an assigned data acquisition cost, said time and cost factors of said confirmatory processes affected by the assigned data acquisition time and an assigned data acquisition cost for said commercial data sources.

4. A method of confirming identity as claimed in claim 3 wherein a respective confirmatory process of said group of confirmatory processes have a respective assigned time factor which is a nominal time factor and a respective assigned cost factor having a value of zero or greater; or a respective assigned cost factor which is a nominal cost factor and a respective assigned time factor having an assigned value of substantially instantaneous or a higher time value;

a selection technique to elect one of two or more confirmatory processes that have identical cost and time factors assigned thereto.

5. A method of confirming identity as claimed in claim 4 wherein said time factor assigned to each confirmatory process includes a data presentation time to said person and an inquiry response time from said person.

6. A method of confirming identity as claimed in claim 5 wherein the prioritization links more comprehensive confirmatory processes, via the respective assigned time and cost factors, and said plurality of external factors, said more comprehensive confirmatory processes defined by either a higher cost factor or a higher time factor or both a higher cost factor and a higher time factor, based upon one or more of the following characteristics of said plurality of external factors:

increasingly higher frequencies of inquiry compared to frequencies of inquiry incorporated as part of said previously acquired data for said person;

increasingly higher amounts of said financial transaction;

increasingly higher amounts of said financial transaction for said person based upon said previously acquired data for said person;

requests for financial transactions from a person wherein the amount of said financial transaction increasingly deviates from prior requested amounts based upon said previously acquired data for said person;

a different communications channel data currently associated with said request to execute said financial transaction than communications channel data for said person based upon said previously acquired data for said person; and a different communications device utilized by said person than communications device for said person based upon said previously acquired data for said person.

7. A method of confirming identity as claimed in claim 6 wherein said communications channel data is channel data from the group of channel data representing an Internet Protocol (IP) address, a telephone caller id, and an automatic number identification (ANI) and wherein said communications device is a communications device from the group of devices including a computer, a personal digital assistant (PDA), a land-line telephone, and a cellular telephone.

8. A method of confirming identity as claimed in claim 7 wherein said acquired data includes a password unique to said person.

9. A method of confirming identity of a person who requests to execute a financial transaction using time-based and cost-based hierarchal confirmatory and clearance processes comprising:

(a) establishing two or more confirmatory processes from the group of confirming processes including:

(i) an operator assisted question and answer (Q and A) session with said person, having assigned representative first time and cost factors associated therewith;

(ii) a voice responsive interactive session with said person comparing responsive data, converted from said voice responsive interactive session, with a first set of acquired data potentially representative of said person, having assigned representative second time and cost factors associated therewith, (iii) an interactive electronic data session comparing electronic responsive data from said person with said first set or a second set of acquired data potentially representative of said person, having assigned representative third time and cost factors associated therewith, (iv) acquiring and comparing a third set of acquired data potentially representative of said person with data supplied by or from said person wherein said third set of acquired data is acquired during a first data acquisition period, and having assigned representative fourth time and cost factors associated therewith, (v) acquiring and comparing further sets of acquired data potentially representative of said person with data supplied by or from said person wherein each said further set of acquired data is acquired during a corresponding further data acquisition period and wherein the further sets of acquired data and corresponding further acquisition periods are larger than said third set of acquired data and said first data acquisition period, respectively, and each having an assigned representative further time and cost factors associated therewith, (b) prioritizing said established confirmatory processes based upon said time factors and cost factors correlated to at least two external factors from the group of external factors including a frequency of inquiry for said person, previously acquired data for said person, amount of said financial transaction, a communications channel data associated with said person seeking said financial transaction, a communications device utilized by said person seeking to execute said financial transaction, a random selection, and a sampling rate for financial transactions;

(c) processing said request for said financial transaction from said person with said confirmatory processes based upon said at least one external factor; and (d) clearing or rejecting said financial transaction based upon the use of the prioritized and established confirmatory processes.

10. A method of confirming identity as claimed in claim 9 wherein a respective confirmatory process of said group of confirmatory processes have a respective assigned time factor which is a nominal time factor and a respective assigned cost factor having a value of zero or greater.

11. A method of confirming identity as claimed in claim 9 wherein a respective confirmatory process of said group of confirmatory processes have a respective assigned cost factor which is a nominal cost factor and a respective assigned time factor having an assigned value of substantially instantaneous or a higher time value.

12. A method of confirming identity as claimed in claim 9
wherein a respective confirmatory process of said group of confirmatory processes have
a respective assigned time factor which is a nominal time factor and a respective assigned cost factor having a value of zero or greater; or
a respective assigned cost factor which is a nominal cost factor and a respective assigned time factor having an assigned value of substantially instantaneous or a higher time value;
and, in the event that two or more confirmatory processes have identical cost and time factors assigned thereto, the method employs a random selection therebetween or a preselected default thereetween.

13. A method of confirming identity as claimed in claim 12 wherein a plurality of confirmatory processes are utilized to clear or reject said requested financial transaction, and wherein a plurality of external factors are utilized to prioritize said plurality of confirmatory processes,
wherein the prioritization links more comprehensive confirmatory processes, via the respective assigned time and cost factors, and said plurality of external factors, said more comprehensive confirmatory processes defined by either a higher cost factor or a higher time factor or both a higher cost factor and a higher time factor, based upon one or more of the following characteristics of said plurality of external factors:
increasingly higher frequencies of inquiry compared to frequencies of inquiry incorporated as part of said previously acquired data for said person;
increasingly higher amounts of said financial transaction;
increasingly higher amounts of said financial transaction for said person based upon said previously acquired data for said person;
requests for financial transactions from a person wherein the amount of said financial transaction increasingly deviates from prior requested amounts based upon said previously acquired data for said person;
a different communications channel data currently associated with said request to execute said financial transaction than communications channel data for said person based upon said previously acquired data for said person; and
a different communications device utilized by said person than communications device for said person based upon said previously acquired data for said person.

14. A method of confirming identity as claimed in claim 13 wherein said communications channel data is channel data from the group of channel data representing an Internet Protocol (IP) address, a telephone caller id, and an automatic number identification (ANI) and wherein said communications device is a communications device from the group of devices including a computer, a personal digital assistant (PDA), a land-line telephone, and a cellular telephone.

15. A method of confirming identity as claimed in claim 14 wherein said acquired data includes a password unique to said person.

16. A method of confirming identity as claimed in claim 15 wherein said operated assisted Q and A session includes comparing answers from said person with previously acquired data for said person.

17. A method of confirming identity as claimed in claim 9 including gathering said first, second, third and further sets of acquired data from commercial data sources.

18. A method of confirming identity as claimed in claim 17 wherein said commercial data sources have an assigned data acquisition time and an assigned data acquisition cost, said time and cost factors of said confirmatory processes affected by the assigned data acquisition time and an assigned data acquisition cost for said commercial data sources.

19. A method of confirming identity as claimed in claim 18 wherein a plurality of confirmatory processes are utilized to clear or reject the requested financial transaction, and wherein a plurality of external factors are utilized to prioritize said plurality of confirmatory processes,
wherein a respective confirmatory process of said group of confirmatory processes have
a respective assigned time factor which is a nominal time factor and a respective assigned cost factor having a value of zero or greater; or
a respective assigned cost factor which is a nominal cost factor and a respective assigned time factor having an assigned value of substantially instantaneous or a higher time value;
and, in the event that two or more confirmatory processes have identical cost and time factors assigned thereto, the method employs a random selection therebetween or a preselected default thereetween.

20. A method of confirming identity as claimed in claim 18 wherein said time factor assigned to each confirmatory process includes a data presentation time to said person and an inquiry response time from said person.

21. A method of confirming identity as claimed in claim 20
wherein the prioritization links more comprehensive confirmatory processes, via the respective assigned time and cost factors, and said plurality of external factors, said more comprehensive confirmatory processes defined by either a higher cost factor or a higher time factor or both a higher cost factor and a higher time factor, based upon one or more of the following characteristics of said plurality of external factors:
increasingly higher frequencies of inquiry compared to frequencies of inquiry incorporated as part of said previously acquired data for said person;
increasingly higher amounts of said financial transaction;
increasingly higher amounts of said financial transaction for said person based upon said previously acquired data for said person;
requests for financial transactions from a person wherein the amount of said financial transaction increasingly deviates from prior requested amounts based upon said previously acquired data for said person;
a different communications channel data currently associated with said request to execute said financial transaction than communications channel data for said person based upon said previously acquired data for said person; and
a different communications device utilized by said person than communications device for said person based upon said previously acquired data for said person.

22. A method of confirming identity as claimed in claim 21 wherein said communications channel data is channel data from the group of channel data representing an Internet Protocol (IP) address, a telephone caller id, and an automatic number identification (ANI) and wherein said communications device is a communications device from the group of devices including a computer, a personal digital assistant (PDA), a land-line telephone, and a cellular telephone.

23. A method of confirming identity as claimed in claim 22 wherein said acquired data includes a password unique to said person.

24. A computerized method of confirming identity of a person who requests to execute a financial transaction using time-based and cost-based hierarchal confirmatory and clearance processes, said person seeking to execute said financial transaction via one communications device from the group of devices including a computer, a personal digital assistant (PDA), a land-line telephone, and a cellular telephone, the method comprising:

(a) automatically selecting, based upon time and cost factors and said communications device, two or more of the following plurality of confirmatory processes:

a voice responsive interactive session, having an assigned representative first time and cost factors, with said person by comparing converted voice responsive data with a first set of acquired data potentially representative of said person;

an interactive electronic data session, having an assigned representative third time and cost factors, comparing electronic responsive data from said person with said first set or a second set of acquired data potentially representative of said person;

acquiring and comparing a third set of acquired data, having an assigned representative fourth time and cost factors, with data from said person;

acquiring and comparing further sets of acquired data, each having an assigned representative further time and cost factor, with data from said person, each said further set of acquired data having one of a higher cost factor or a longer data acquisition factor or both a higher cost factor and a longer data acquisition factor;

(b) employing more comprehensive confirmatory processes, defined by either a higher cost factor or a higher time factor or both a higher cost factor and a higher time factor, based upon a plurality of external factors from the group including: a frequency of inquiry for said person, previously acquired data for said person, charge back data for said person, bill payment data for said person, amount of said financial transaction, a communications channel data associated with said person seeking said financial transaction, a communications device utilized by said person seeking to execute said financial transaction, a random selection, and a sampling rate for financial transactions;

(c) processing said request for said financial transaction; and (d) clearing or rejecting said financial transaction based upon the confirmatory processes.

25. A method of confirming identity as claimed in claim 24 wherein said operated assisted Q and A session includes comparing answers from said person with previously acquired data for said person.

26. A computerized method of confirming identity as claimed in claim 24 including electronically gathering said first, second, third and nth set of acquired data from commercial data sources.

27. A computerized method of confirming identity as claimed in claim 26 wherein said commercial data sources have respective assigned data acquisition times and respective assigned data acquisition costs, said time and cost factors of respective confirmatory processes affected by the assigned data acquisition times and an assigned data acquisition costs for said commercial data sources.

28. A computerized method of confirming identity as claimed in claim 27 wherein a respective confirmatory process of said group of confirmatory processes have a respective assigned time factor which is a nominal time factor and a respective assigned cost factor having a value of zero or greater, said nominal time factor associated with system stored data; or a respective assigned cost factor which is a nominal cost factor and a respective assigned time factor having an assigned value of substantially instantaneous or a higher time value, said substantially instantaneous time factor associated with system stored data;

and the method includes selecting confirmatory processes that have low cost and time factors initially and acquiring said nth set of acquired data based upon predetermined one of said group of external factors.

29. A computerized method of confirming identity as claimed in claim 28 wherein said time factor assigned to each confirmatory process includes a data presentation time to said person and an inquiry response time from said person.

30. A computerized method of confirming identity as claimed in claim 29 wherein more comprehensive confirmatory processes are selected based upon one or more of the following characteristics of said plurality of external factors:

increasingly higher frequencies of inquiry compared to frequencies of inquiry incorporated as part of said previously acquired data for said person;

increasingly higher amounts of said financial transaction;

increasingly higher amounts of said financial transaction for said person based upon said previously acquired data for said person;

requests for financial transactions from a person wherein the amount of said financial transaction increasingly deviates from prior requested amounts based upon said previously acquired data for said person;

a different communications channel data currently associated with said request to execute said financial transaction than communications channel data for said person based upon said previously acquired data for said person; and a different communications device utilized by said person than communications device for said person based upon said previously acquired data for said person.

31. A computerized method of confirming identity as claimed in claim 30 including detecting communications channel data from said person's communications device, said communications channel data being an Internet Protocol (IP) address, a telephone caller id, and an automatic number identification (ANI) based upon the person's communications device.

32. A computerized method of confirming identity as claimed in claim 31 wherein said acquired data includes a password unique to said person which was previously stored and associated with said person.

* * * * *